(12) United States Patent
Alexopoulos et al.

(10) Patent No.: US 8,922,446 B2
(45) Date of Patent: Dec. 30, 2014

(54) THREE-DIMENSIONAL ANTENNA ASSEMBLY AND APPLICATIONS THEREOF

(71) Applicant: Broadcom Corporation, Irvine, CA (US)

(72) Inventors: Nicolaos G. Alexopoulos, Irvine, CA (US); Seunghwan Yoon, Costa Mesa, CA (US)

(73) Assignee: Broadcom Corporation, Irvine, CA (US)

(*) Notice: Subject to any disclaimer, the term of this patent is extended or adjusted under 35 U.S.C. 154(b) by 218 days.

(21) Appl. No.: 13/720,686

(22) Filed: Dec. 19, 2012

(65) Prior Publication Data

US 2013/0249760 A1 Sep. 26, 2013

Related U.S. Application Data

(63) and a continuation-in-part of application No. 13/037,051, filed on Feb. 28, 2011, which is a continuation of application No. 13/034,957, filed on Feb. 25, 2011.

(60) Provisional application No. 61/614,685, filed on Mar. 23, 2012, provisional application No. 61/731,848, filed on Nov. 30, 2012, provisional application No. 61/322,873, filed on Apr. 11, 2010.

(51) Int. Cl.
| | |
|---|---|
| *H01Q 21/00* | (2006.01) |
| *H01Q 1/36* | (2006.01) |
| *H01Q 9/16* | (2006.01) |
| *H01Q 9/27* | (2006.01) |
| *H01Q 21/06* | (2006.01) |
| *H01Q 21/20* | (2006.01) |

(52) U.S. Cl.
CPC .............. *H01Q 21/0006* (2013.01); *H01Q 9/16* (2013.01); *H01Q 9/27* (2013.01); *H01Q 21/06* (2013.01); *H01Q 21/20* (2013.01)
USPC .......................................... 343/816; 343/895

(58) Field of Classification Search
CPC ..... H01Q 21/0006; H01Q 21/06; H01Q 1/16; H01Q 1/38
USPC .................................................. 343/816, 895
See application file for complete search history.

(56) References Cited

U.S. PATENT DOCUMENTS

| | | | | |
|---|---|---|---|---|
| 5,146,234 | A | * | 9/1992 | Lalezari ........................ 343/895 |
| 6,018,327 | A | * | 1/2000 | Nakano et al. ................ 343/895 |

(Continued)

*Primary Examiner* — Hoang V Nguyen
(74) *Attorney, Agent, or Firm* — Garlick & Markison; Bruce E. Garlick

(57) ABSTRACT

An antenna assembly includes a substrate, a plurality of spiral dipole antenna sections, and a phase array feeder. The substrate has a three-dimensional shaped region. Each of the spiral dipole antenna sections is supported by a corresponding section of the three-dimensional shaped region and conforms to the corresponding section of the three-dimensional shaped region such that, collectively, the plurality of spiral dipole antenna sections has an overall shape approximating a three-dimensional shape. The spiral dipole antenna sections are coupled together in accordance with a coupling configuration for beamforming and/or power combining. The phase array feeder inputs, or outputs, a phase offset representations of a radio frequency (RF) signal from, or to, the spiral dipole antenna sections and converts between the phase offset representations of the RF signal and the RF signal.

20 Claims, 13 Drawing Sheets

(56) References Cited

U.S. PATENT DOCUMENTS

| | | | |
|---|---|---|---|
| 6,225,963 B1 * | 5/2001 | Vortmeier | 343/895 |
| 6,466,177 B1 * | 10/2002 | Kunysz | 343/769 |
| 6,842,157 B2 * | 1/2005 | Phelan et al. | 343/893 |
| 8,208,865 B2 * | 6/2012 | Mikhemar et al. | 455/73 |
| 8,305,290 B2 * | 11/2012 | Reavis et al. | 343/895 |

* cited by examiner

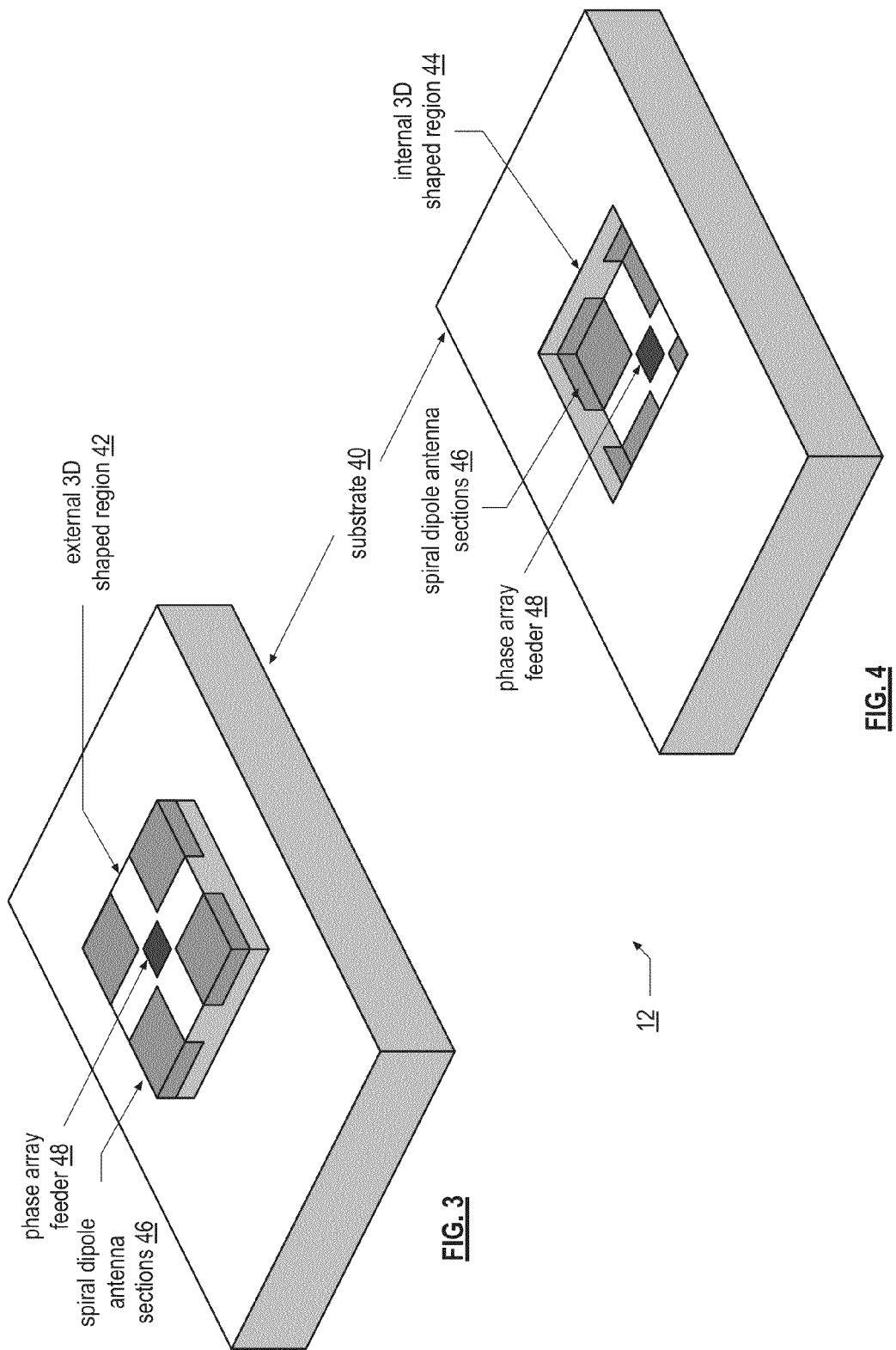

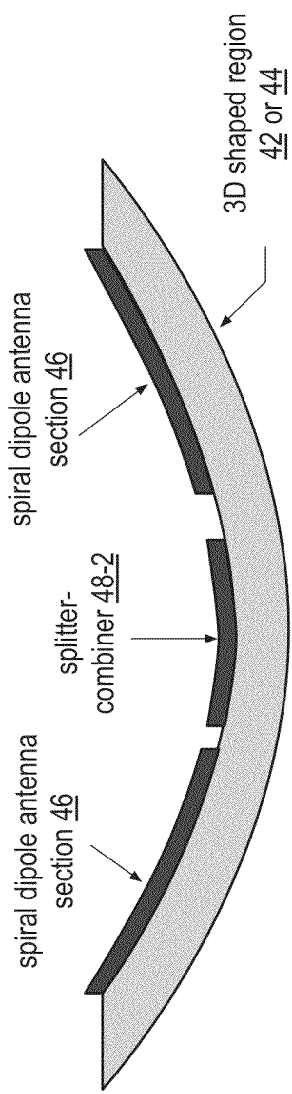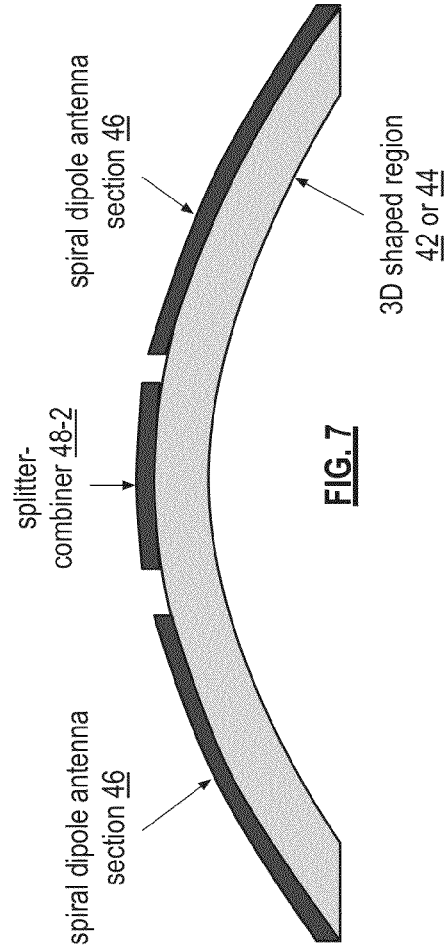

THREE-DIMENSIONAL ANTENNA ASSEMBLY AND APPLICATIONS THEREOF

CROSS REFERENCE TO RELATED PATENTS

The present U.S. Utility Patent Application claims priority pursuant to 35 U.S.C. §119(e) to the following U.S. Provisional Applications which are incorporated herein by reference in their entirety and made part of the present U.S. Utility Patent Application for all purposes:

1. U.S. Provisional Application No. of 61/614,685, entitled "Parabolic Interwoven Assemblies and Applications Thereof," filed Mar. 23, 2012, pending; and 2. U.S. Provisional Application No. 61/731,848, entitled "Three-Dimensional Antenna Assembly and Applications Thereof," filed Nov. 30, 2012, pending.

This patent application is further claiming priority under 35 USC §120 as a continuation-in-part patent application of co-pending patent application entitled RF AND NFC PAMM ENHANCED ELECTROMAGNETIC SIGNALING, having a filing date of Feb. 28, 2011, and an application Ser. No. of 13/037,051 which claims priority under 35 USC §120 as a continuing patent application of co-pending patent application entitled, "PROJECTED ARTIFICIAL MAGNETIC MIRROR", having a filing date of Feb. 25, 2011, and a Ser. No. of 13/034,957, which claims priority under 35 USC §119 (e) to a provisionally filed patent application entitled, "PROJECTED ARTIFICIAL MAGNETIC MIRROR", having a provisional filing date of Apr. 11, 2010, and a provisional Ser. No. of 61/322,873.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to antenna structures used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems to radio frequency radar systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

For an RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver is coupled to the antenna and includes a low noise amplifier, one or more intermediate frequency stages, a filtering stage, and a data recovery stage. The transmitter includes a data modulation stage, one or more intermediate frequency stages, and a power amplifier, which is coupled to the antenna.

Since a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, an antenna array having the same polarization, an antenna array having different polarization, and/or any number of other electromagnetic properties.

While two-dimensional antennas provide reasonably antenna performance for many wireless communication devices, there are issues when the wireless communication devices require full duplex operation and/or multiple input and/or multiple output (e.g., single input multiple output, multiple input multiple output, multiple input single output) operation. For example, for full duplex wireless communications to work reasonably well, received RF signals must be isolated from transmitted RF signals (e.g., >20 dBm). One popular mechanism is to use an isolator. Another popular mechanism is to use duplexers.

BRIEF DESCRIPTION OF THE SEVERAL VIEWS OF THE DRAWING(S)

FIG. 3 is an isometric diagram of an embodiment of a three-dimensional antenna assembly in accordance with the present invention;

FIG. 4 is an isometric diagram of another embodiment of a three-dimensional antenna assembly in accordance with the present invention;

FIG. 6 is a cross sectional view diagram of an embodiment of a three-dimensional antenna assembly in accordance with the present invention;

FIG. 7 is a cross sectional view diagram of another embodiment of a three-dimensional antenna assembly in accordance with the present invention;

DETAILED DESCRIPTION OF THE INVENTION

Figure 1:
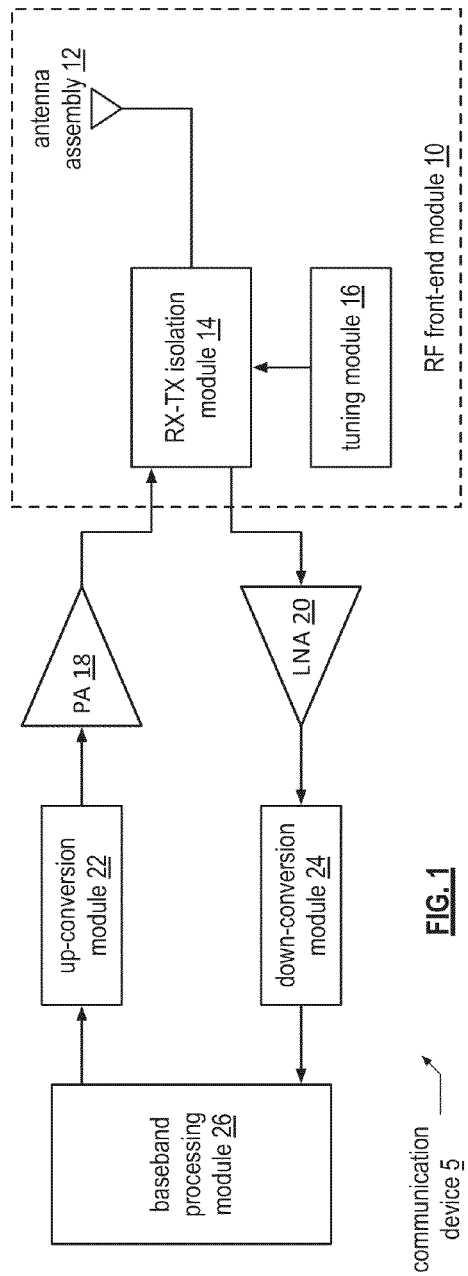
FIG. 1 is a schematic block diagram of an embodiment of a wireless communication device in accordance with the present invention.

FIG. 1 is a schematic block diagram of an embodiment of a wireless communication device 5 that includes a radio frequency (RF) front-end module 10, a power amplifier 18, a low noise amplifier 20, an up-conversion module 22, a down-conversion module 24, and a baseband processing module 26. The RF front-end module 10 includes a three-dimensional (3D) antenna assembly 12, a receive-transmit (RX-TX) isolation module 14, and a tuning module 16.

The communication device 5 may be any device that can be carried by a person, can be at least partially powered by a battery, includes a radio transceiver (e.g., radio frequency (RF) and/or millimeter wave (MMW)) and performs one or more software applications. For example, the communication device 5 may be a cellular telephone, a laptop computer, a personal digital assistant, a video game console, a video game player, a personal entertainment unit, a tablet computer, etc.

In an example of transmitting one or more outbound RF signals, the baseband processing module 26 converts outbound data (e.g., voice, text, video, graphics, video file, audio file, etc.) into one or more streams of outbound symbols in accordance with a communication standard, or protocol. The up-conversion module 22, which may be a direct conversion module or a super heterodyne conversion module, converts the one or more streams of outbound symbols into one or more up-converted signals. The power amplifier 18 amplifies the one or more up-converted signals to produce one or more outbound RF signals. The RX-TX isolation module 14 isolates the outbound RF signal(s) from inbound RF signal(s) and provides the outbound RF signal(s) to the 3D antenna assembly 12 for transmission. Note that the tuning module 16 tunes the RX-TX isolation module 14.

In an example of receiving one or more inbound RF signals, the 3D antenna assembly 12 receives the inbound RF signal(s) and provides them to the RX-TX isolation module 14. The RX-TX isolation module 14 isolates the inbound RF signal(s) from the outbound RF signal(s) and provides the inbound RF signal(s) to the low noise amplifier 20. The low noise amplifier 20 amplifies the inbound RF signal(s) and the down-conversion module 24, which may be a direct down conversion module or a super heterodyne conversion module, converts the amplified inbound RF signal(s) into one or more streams of inbound symbols. The baseband processing module 26 converts the one or more streams of inbound symbols into inbound data.

The RF front-end module 10 may be implemented as an integrated circuit (IC) that includes one or more IC dies and an IC package substrate. The tuning module 16 is implemented on the one or more IC dies. The IC package substrate supports the IC die(s) and may further include the 3D antenna assembly 12. The RX-TX isolation module 14 may be implemented on the one or more IC dies and/or on the IC package substrate. One or more of the power amplifier 18, the low noise amplifier 20, the up-conversion module 22, the down-conversion module 24, and the baseband processing module 26 may be implemented on the one or more IC dies.

Figure 2:
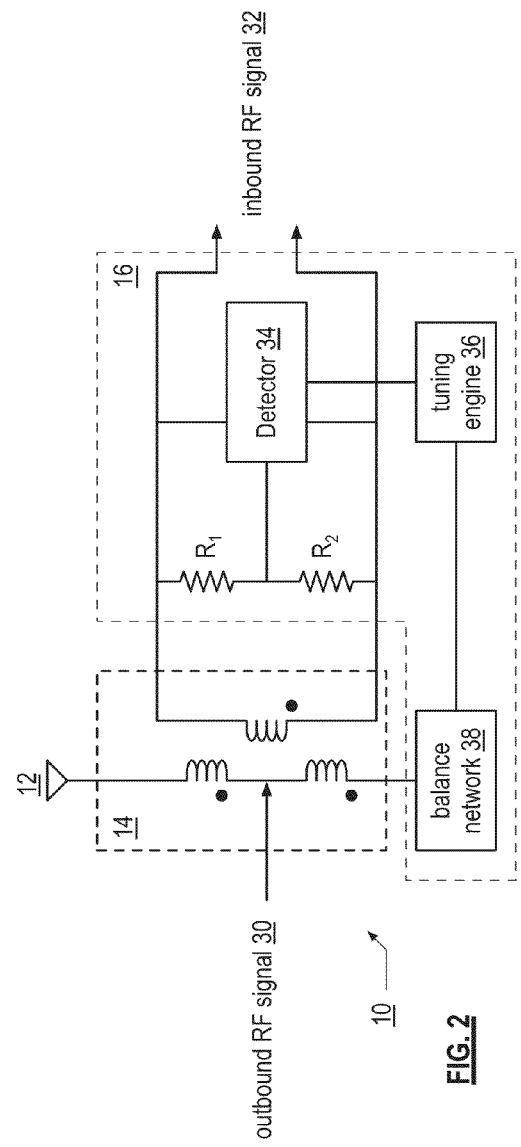
FIG. 2 is a schematic block diagram of an embodiment of an RF front-end module in accordance with the present invention.

FIG. 2 is a schematic block diagram of an embodiment of an RF front-end module 10 that includes the 3D antenna assembly 12, a duplexer 14-1 and a balance network 14-2 as the RX-TX isolation module 14, and a resistor divider (R1 and R2), a detector 34, and a tuning engine 36 as the tuning module 16. The duplexer 14-1 ideally functions, with respect to the secondary winding, to add the voltage induced by the inbound RF signal on the two primary windings and to subtract the voltage induced by the outbound RF signal on the two primary windings such that no outbound RF signal is present on the secondary winding and that two times the inbound RF signal is present on the secondary winding. The balance network 14-2 adjusts its impedance based on feedback from the tuning module 16 to substantially match the impedance of the 3D spiral antenna such that the duplexer functions more closely to ideal.

FIG. 3 is an isometric diagram of an embodiment of a three-dimensional antenna assembly 12 that includes a substrate 40, spiral dipole antenna sections 46, and a phase array feeder 48 coupled to one or more connection points of the spiral antenna sections 46. The substrate 40, which may be one or more printed circuit boards, one or more integrated circuit package substrates, and/or a non-conductive fabricated antenna backing structure, includes an external three-dimension shaped region 42 (e.g., extends beyond the surface, or a perimeter, of the substrate 40). The spiral dipole antenna sections 46 are supported by and, collectively, conform to the three-dimensional shaped region 42 such that the spiral dipole antenna sections 46 have an overall shape approximating a three-dimensional shape.

For example, when the three-dimensional shaped region 42 has a hyperbolic shape, each spiral dipole antenna section 46 is in a region of the hyperbolic shape and has a shape that corresponds to the respective region. Collectively, the spiral dipole antenna sections 46 have a hyperbolic shape that is about the same size as the three-dimensional shaped region 42. As a further example, the substrate 40 may be a non-conductive antenna backing structure (e.g., plastic, glass, fiberglass, etc.) that is encompassed by the 3D shaped region 42 to provide a hyperbolic shaped antenna. The diameter of the hyperbolic shape may range from micrometers for high frequency (e.g., tens of gigi-hertz) and/or low power applications to tens of meters for lower frequency and/or higher power applications.

As another example, the three-dimensional shaped region 42 has a conical shape and each spiral dipole antenna section 46 is in a region of the conical shape and has a shape that corresponds to the respective region. Collectively, the spiral dipole antenna sections 46 have a conical shape and are about the same size as the three-dimensional shaped region 42. The three-dimensional shaped region 42 may have other shapes, such as a cup shape, a cylindrical shape, a pyramid shape, a box shape (as shown in FIG. 3), a spherical shape, or a parabolic shape.

FIG. 4 is an isometric diagram of another embodiment of a three-dimensional antenna assembly 12 that includes a substrate 40, spiral dipole antenna sections 46, and a phase array feeder 48 coupled to one or more connection points of the spiral dipole antenna sections 46. The substrate 40, which may be one or more printed circuit boards, one or more integrated circuit package substrates, and/or a non-conductive fabricated antenna backing structure, includes an internal three-dimension shaped region 44 (e.g., extends inward with respect to the surface or outer edge of the substrate 40). Each of the spiral dipole antenna sections 46 is supported by and conforms to a respective region of the three-dimensional shaped region 44 such that, collectively, the spiral dipole antenna sections 46 have an overall shape approximating a three-dimensional shape. The three-dimensional shaped region 44 may have a cup shape, a parabolic shape, a conical shape, a box shape (as shown in FIG. 4), a cylindrical shape, a pyramid shape, or a spherical shape.

Figure 5:
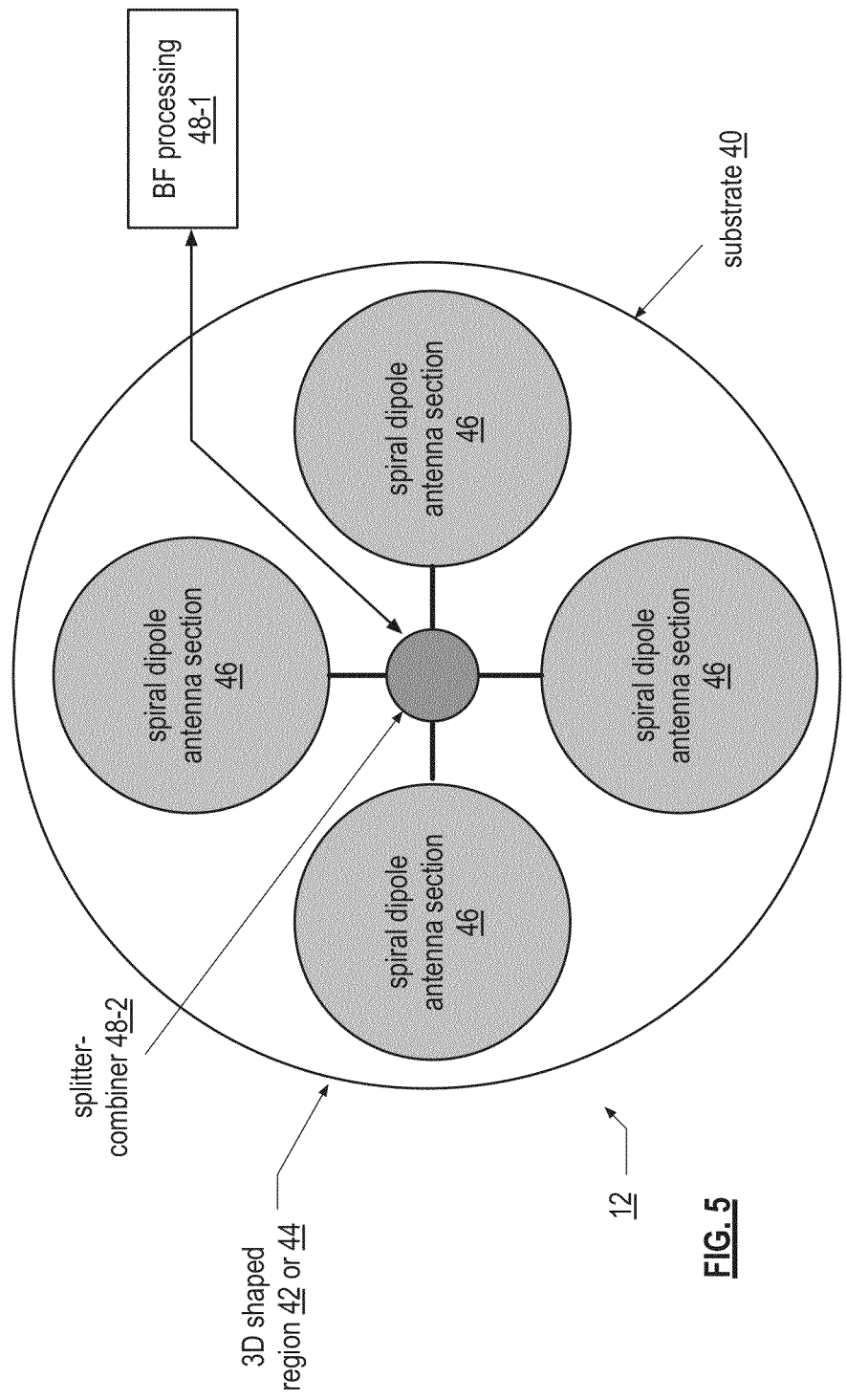
FIG. 5 is a schematic block diagram of another embodiment of a three-dimensional antenna assembly in accordance with the present invention.

FIG. 5 is a schematic block diagram of an embodiment of a three-dimensional antenna assembly 12 that includes the substrate 40, four spiral dipole antenna sections 46, a splitter-combiner 48-2 and a beamforming (BF) processing module 48-1 (which may be on the substrate 40 or on an IC die) as the phase array feeder 48. The spiral dipole antenna sections 46 are coupled to the splitter-combiner 48-2 and each of the sections 46 may include one or more spiral antenna elements; examples of which will be discussed in greater detail with reference to one or more of FIGS. 8-9.

In this example, the substrate 40 has a parabolic or a hyperbolic shape. Each of the spiral dipole antenna sections 46 is attached (e.g., implemented, affixed, adhered, embedded, encased, etc.) to a region of the substrate and has a shape corresponding to the region of the substrate. For instance, if the substrate 40 is divided into four regions—each a quarter of the hyperbolic or parabolic shape—, then each region has a quarter hyperbolic or parabolic shape. Accordingly, each spiral dipole antenna section 46 has a quarter hyperbolic or quarter parabolic shape.

In an example of transmitting an outbound RF signal, the BF processing module 48-1 receives the outbound RF signal and, in accordance with a desired beamforming angle, outputs one or more beamforming representations of the outbound RF signal. For example, the BF processing module 48-1 generates a phase shifted representation of the outbound RF signal. The splitter-combiner 48-2 splits the phase shifted representation of the outbound RF signal into four phase offset representations of the outbound RF signal. The splitter-combiner 48-2 provides the four phase offset representations of the outbound RF signal to the spiral dipole antenna sections 46, which transmit them. The transmitted phase offset representations of the outbound RF signal are combined in air to produce a beamformed outbound RF signal having an angle corresponding to the desired beamforming angle. As a specific example, the desired beamforming angle is five degrees and the phase offset angles are zero degrees, ninety degrees, one-hundred eighty degrees, and two-hundred seventy degrees. As such, if the outbound RF signal is expressed as $A(t) \cos(\omega_{RF}+\Phi(t))$, then the phase shifted representation is $A(t) \cos(\omega_{RF}+\Phi(t)+5)$ and the phase offset representations are $A(t) \cos(\omega_{RF}+\Phi(t)+5)$, $A(t) \cos(\omega_{RF}+\Phi(t)+95)$, $A(t) \cos(\omega+\Phi(t)+185)$, and $A(t) \cos(\omega_{RF}+\Phi(t)+275)$.

As another example, the BF processing module 48-1 determines which spiral dipole antenna sections 46 are to transmit a phase offset representation of the outbound RF signal. For instance, if a first beamforming angle is desired, then one of the four sections 46 is selected to transmit a corresponding phase offset representation of the outbound RF signal; if a second beamforming angle is desired, then two of the four sections 46 are selected to transmit corresponding phase offset representations of the outbound RF signal; if a third beamforming angle is desired, then three of the four sections 46 are selected to transmit corresponding phase offset representations of the outbound RF signal; and if power combining with no beamforming is desired, then all four sections 46 are selected to transmit corresponding phase offset representations of the outbound RF signal. The BF processing module 48-1 provides outbound RF signal to the splitter-combiner 48-1, which creates the phase offset representations of the outbound RF signal. The BF processing module 48-1 controls which of the phase offset representations of the outbound RF signal are provided to the corresponding spiral dipole antenna sections 46 for transmission.

In an example of receiving an inbound RF signal, each of the spiral dipole antennas receives a phase offset representation of the inbound RF signal. The splitter-combiner 48-2 combines the phase offset representations of the inbound RF signal to produce a beamformed inbound RF signal. The BF processing module 48-1 removes a beamforming angle from the beamformed inbound RF signal to produce the inbound RF signal. As a specific example, the beamforming angle is five degrees and the phase offset angles are zero degrees, ninety degrees, one-hundred eighty degrees, and two-hundred seventy degrees. As such, if the inbound RF signal is expressed as $A(t) \cos(\omega_{RF}+\Phi(t))$, then the beamformed inbound RF signal is $A(t) \cos(\omega_{RF}+\Phi(t)+5)$ and the phase offset representations are $A(t) \cos(\omega_{RF}+\Phi(t)+5)$, $A(t) \cos(\omega_{RF}+\Phi(t)+95)$, $A(t) \cos(\omega_{RF}+\Phi(t)+185)$, and $A(t) \cos(\omega_{RF}+\Phi(t)+275)$.

As another example, the BF processing module 48-1 determines which spiral dipole antenna sections 46 are to be used to produce the inbound RF signal. For instance, if a first beamforming angle was transmitted, then one of the four sections 46 is selected; if a second beamforming angle was transmitted, then two of the four sections 46 are selected; if a third beamforming angle was transmitted, then three of the four sections 46 are selected; and if power combining with no beamforming was transmitted, then all four sections 46 are selected. The BF processing module 48-1 controls the splitter-combiner 48-1 to combine one or more phase offset representations of the inbound RF signal into the inbound RF signal.

Figure 14:
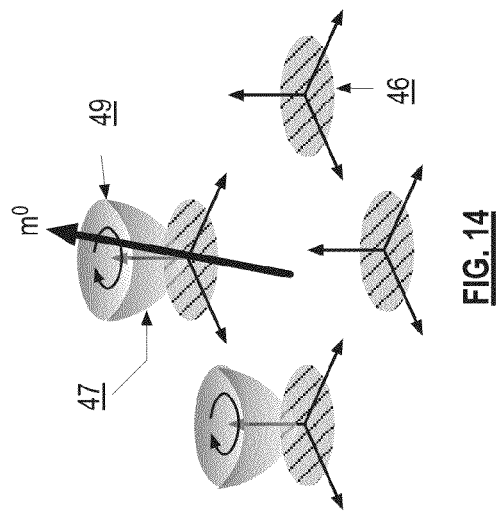
Figure 15:
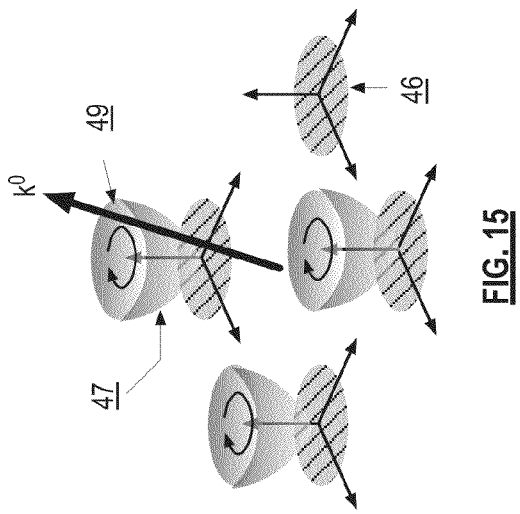

While the present example illustrates four spiral antenna sections 46, the 3D multiple spiral antenna 12 may include more or less than four spiral antenna sections. For instance, and as shown in FIGS. 14 and 15, the 3D multiple spiral antenna 12 includes three spiral antenna sections 46.

FIG. 6 is a cross sectional view diagram of an embodiment of the three-dimensional antenna assembly 12 that includes spiral dipole antenna sections 46, the splitter-combiner 48-2, and a three-dimensional parabolic shaped substrate 40. FIG. 7 is a cross-sectional diagram of the three-dimensional antenna assembly 12 that includes the spiral dipole antenna sections, 46, the splitter-combiner 48-2, and a three-dimensional hyperbolic shaped substrate 40. Note that each of the spiral dipole antenna sections 46 may be implemented in accordance with one or more of FIGS. 8-9.

Figure 8:
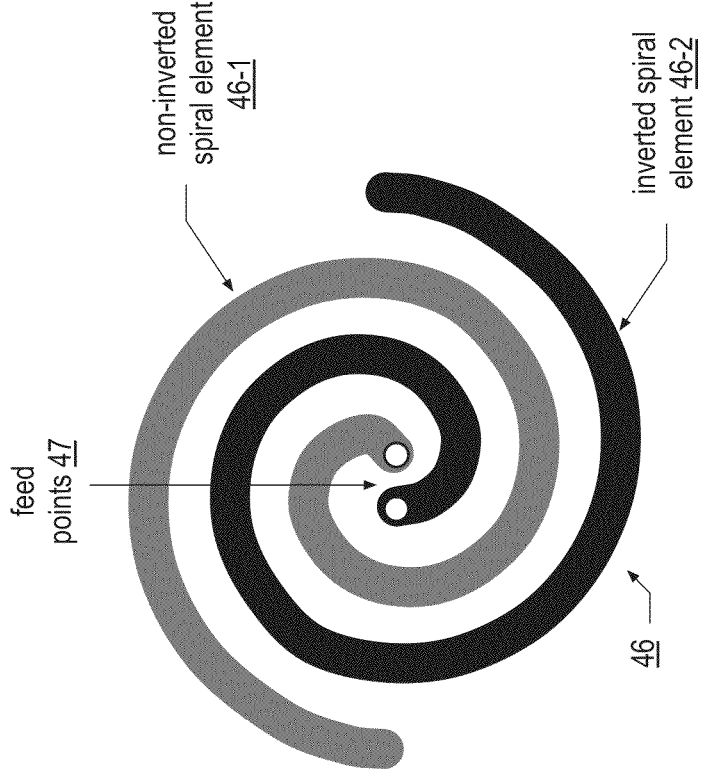
FIG. 8 is a schematic block diagram of an embodiment of a spiral dipole antenna section in accordance with the present invention.

FIG. 8 is a diagram of an embodiment of a spiral antenna section 46 that includes a non-inverted spiral coil element 46-1 interwoven with an inverting spiral coil element 46-2. Feed points 47 are located at, or near, the inner end of each coil element, which are coupled via a transmission line to the splitter combiner. Each of the coils includes one or more turns and has an Archimedean symmetric spiral shape, an Archimedean eccentric spiral shape, an equiangular symmetric spiral shape, or an equiangular eccentric spiral shape. Further, each coil element 46-1 and 46-2 includes a conductive wire to produce the one or more turns.

Figure 9:
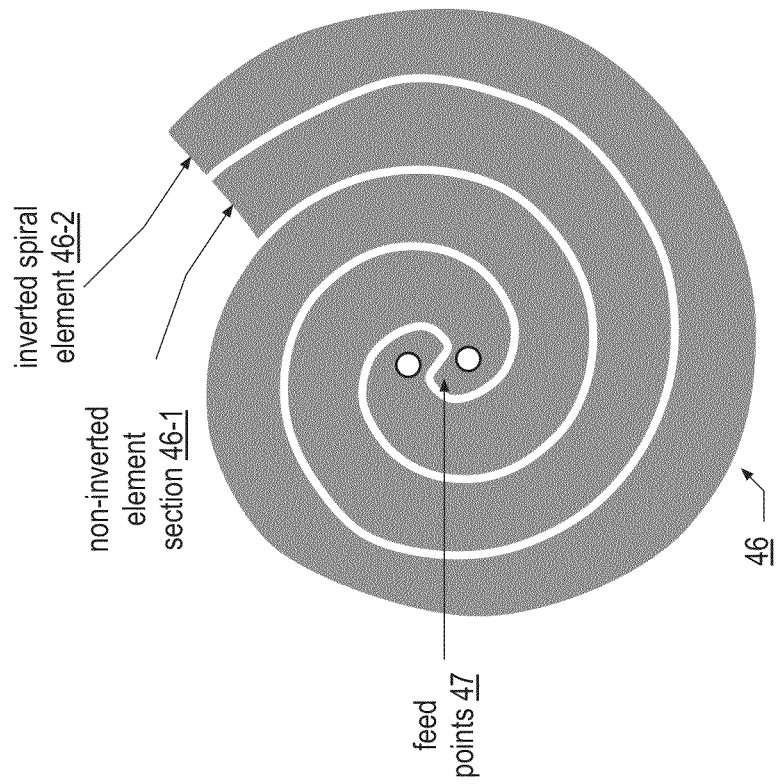
FIG. 9 is a schematic block diagram of another embodiment of a spiral dipole antenna section in accordance with the present invention.

FIG. 9 is a diagram of an embodiment of a spiral antenna section 46 that includes a non-inverted spiral coil element 46-1 interwoven with an inverting spiral coil element 46-2. Feed points 47 are located at, or near, the inner end of each coil element, which are coupled via a transmission line to the splitter combiner. Each of the coils includes one or more turns and has an Archimedean symmetric spiral shape, an Archimedean eccentric spiral shape, an equiangular symmetric spiral shape, or an equiangular eccentric spiral shape. Further, each coil element 46-1 and 46-2 includes a substantially solid conductor with a multiple turn spiral slot separating the non-inverting spiral coil from the inverting spiral coil.

For either implementation of the spiral dipole antenna section of FIG. 8 or 9, the spiral nature of the section 46 creates an antenna gain of approximately 3 dB. The gain of the antenna 12 is further increased by approximately 2 dB due the three-dimensional shape of the antenna sections 46 (e.g., a three-dimensional gain component). As such, the 3D antenna assembly 12 has approximately a 5 dB gain. Further, the frequency band of operation of the 3D antenna assembly 12 is based, at least in part, on the physical attributes of the antenna sections 46. For instance, the dimensions of the excitation region of each of the spiral antenna sections 46 (i.e., the feed point and/or the radius of the inner turn) establish an upper cutoff region of the bandwidth and the circumference of each of the spiral antenna sections 46 establishes a lower cutoff region of the bandwidth. The spiral pattern creates a circular polarization. The trace width, distance between traces, length of each spiral section, distance to a ground plane, and/or use of an artificial magnetic conductor plane affect the quality factor, radiation pattern, impedance (which is fairly constant over the bandwidth), gain, and/or other characteristics of the antenna assembly 12.

Figure 10:
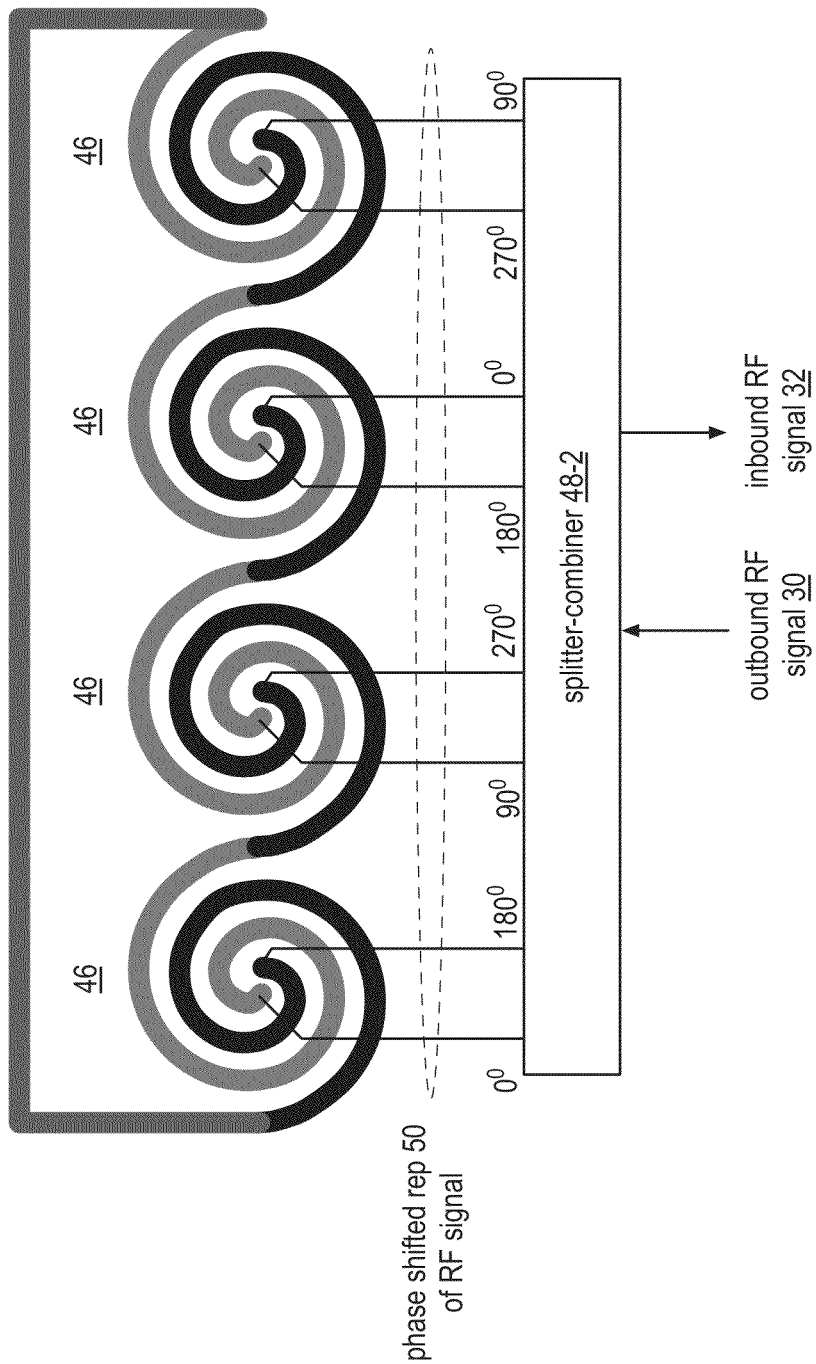
FIG. 10 is a schematic block diagram of another embodiment of a three-dimensional antenna assembly in accordance with the present invention.

FIG. 10 is a schematic block diagram of another embodiment of a three-dimensional antenna assembly 12 that includes a plurality of spiral dipole antenna sections 46 and a splitter-combiner 48-2. Each of the spiral dipole antenna sections 46 includes a non-inverting spiral coil, an inverting spiral coil, and a dipole feed point proximal to an inner winding of the non-inverting and inverting spiral coils. The coupling configuration of the antenna sections 46 includes coupling the non-inverting spiral coils and the inverting spiral coils of the spiral dipole antenna sections 46 such that the spiral dipole antenna sections function as transformer baluns and antennas for the antenna assembly 12.

In an example embodiment, the coupling configuration includes coupling the feed points of the antenna sections to differential outputs of the splitter-combiner 48-2 and coupling ends of the sections to ends of other sections. In this manner, each of the spiral dipole antenna sections 46 receives respective ones of the plurality of phase offset representations of the RF signal created by the splitter-combiner 48-2. Thus, for an outbound RF signal, each of the spiral antenna sections 46 transmits a respective phase-shifted representation of the outbound RF signals and, with the ends of the antenna sections 46 coupled together, the sections 46 provide a multiple sinusoidal cycle standing wave output (i.e., the voltage and current at the ends points are not constant (e.g., zero current and non-zero voltage) and, collectively, the spiral antenna sections 46 produce standing current and standing voltage sinusoidal signals over 720 degrees). With the length of the connection traces corresponding to the phase shift (e.g., 120 degrees for three phase shifted representations), the current and voltage at the end of one spiral antenna section are at the same phase of a sinusoidal signal as the current and voltage at the end of one of the other sections 46.

Figure 11:
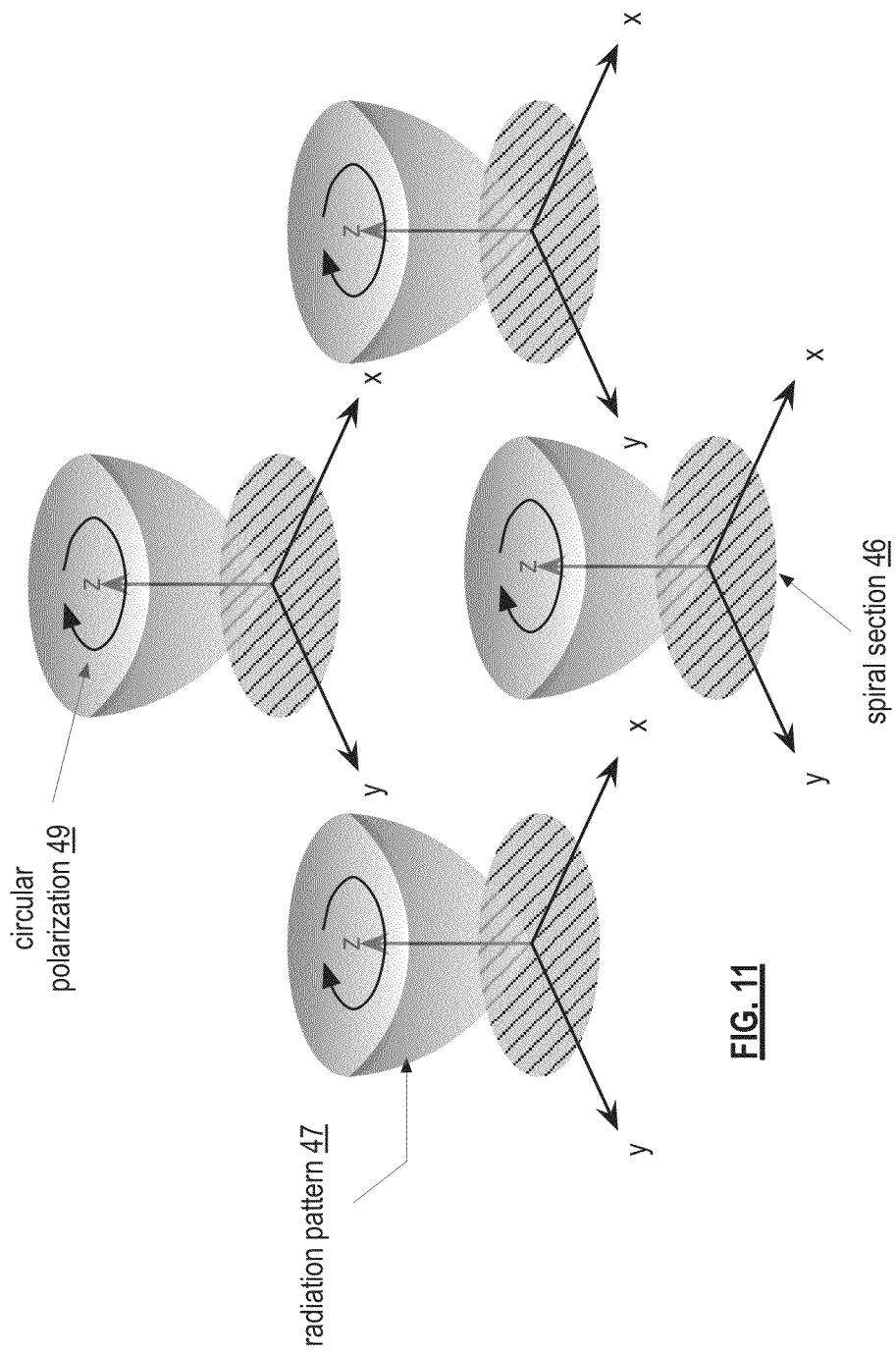
FIG. 11 is a diagram of an example of a radiation pattern of a three-dimensional antenna assembly of FIG. 10 in accordance with the present invention.

FIG. 11 is a diagram of an example of a radiation pattern of a three-dimensional antenna assembly of FIG. 10. As shown, each antenna section 46 has a radiation pattern 47 that is perpendicular to the x-y plane on which the antenna section 46 resides, which conforms to the 3D region of the substrate 40. In addition, each antenna section 46 has a circular polarization (e.g., clockwise or counter-clockwise). The radiation patterns of the antenna sections 46 combine in air to increase receiver sensitivity and transmission power.

Figure 12:
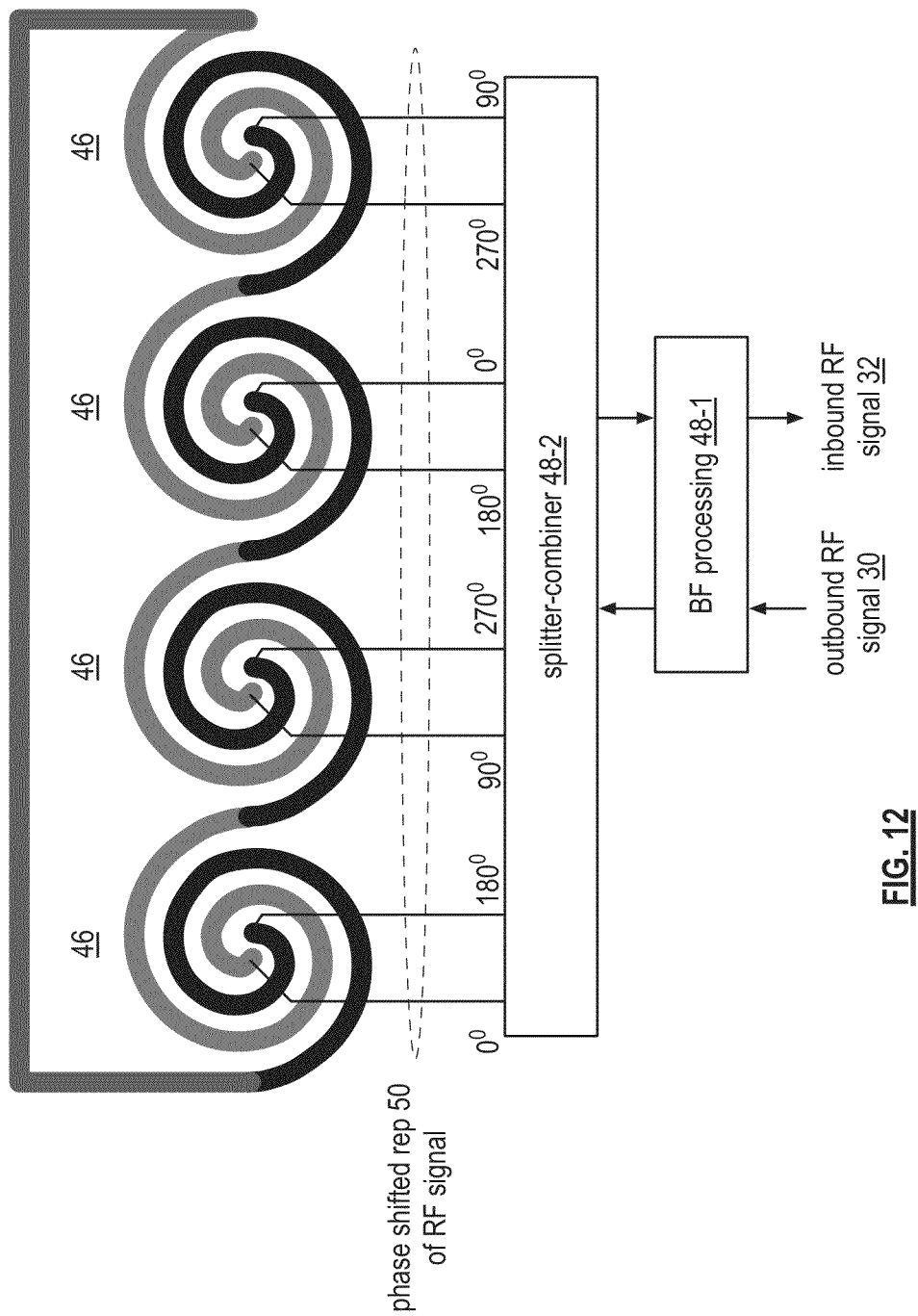
FIG. 12 is a schematic block diagram of another embodiment of a three-dimensional antenna assembly in accordance with the present invention.

FIG. 12 is a schematic block diagram of another embodiment of a three-dimensional antenna assembly 12 similar to the antenna assembly 12 of FIG. 10 with the addition of the beamforming (BF) processing module 48-1. As mentioned above in one example embodiment, the BF processing module 48-1 determines a beamforming angle and generates a phase shifted RF signal (inbound or outbound). The splitter-combiner 48-2 splits or combines between the phase offset representations of the RF signal and the phase shifted RF signal. As mentioned above in another example embodiment, the BF processing module 48-1 determines which of the antenna sections are to transmit or receive a beamformed RF signal.

Figure 13:
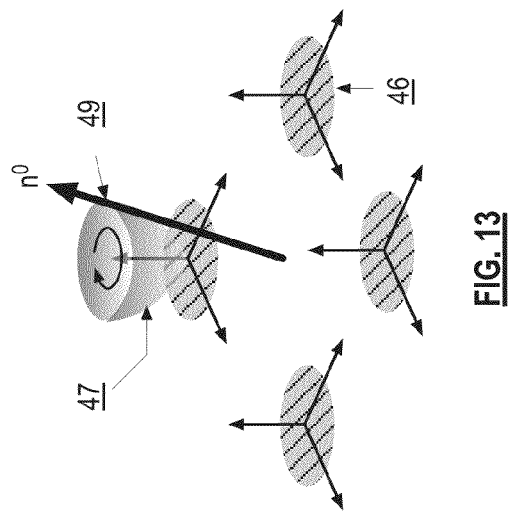
FIGS. 13-16 are diagrams of examples of radiation patterns of a three-dimensional antenna assembly of FIG. 12 in accordance with the present invention.
Figure 16:
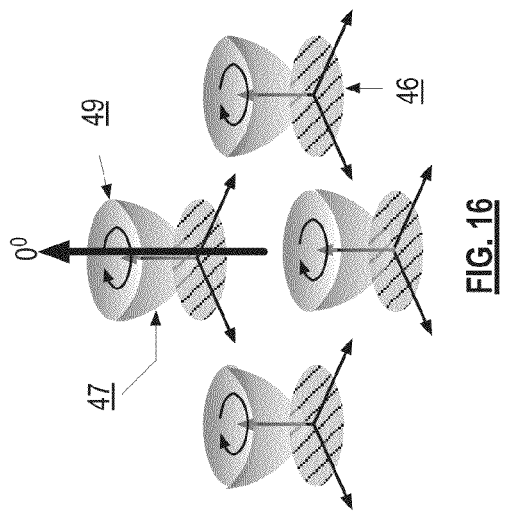

FIGS. 13-16 are diagrams of examples of radiation patterns of a three-dimensional antenna assembly of FIG. 12 with various beamforming angles produced by enabling different combinations of the antenna sections 46. As shown in FIG. 13, one antenna section 46 is enabled, which yields a beamformed RF signal having a beamforming angle of 'n' degrees, where n is greater than or equal to two. As shown in FIG. 14, two antenna sections 46 are enabled, which yields a beamformed RF signal having a beamforming angle of 'm' degrees, where m is less than n. As shown in FIG. 15, three antenna sections 46 are enabled, which yields a beamformed RF signal having a beamforming angle of 'k' degrees, where k is less than m. As shown in FIG. 16, four antenna sections 46 are enabled, which yields a beamformed RF signal having a beamforming angle of zero degrees.

Figure 17:
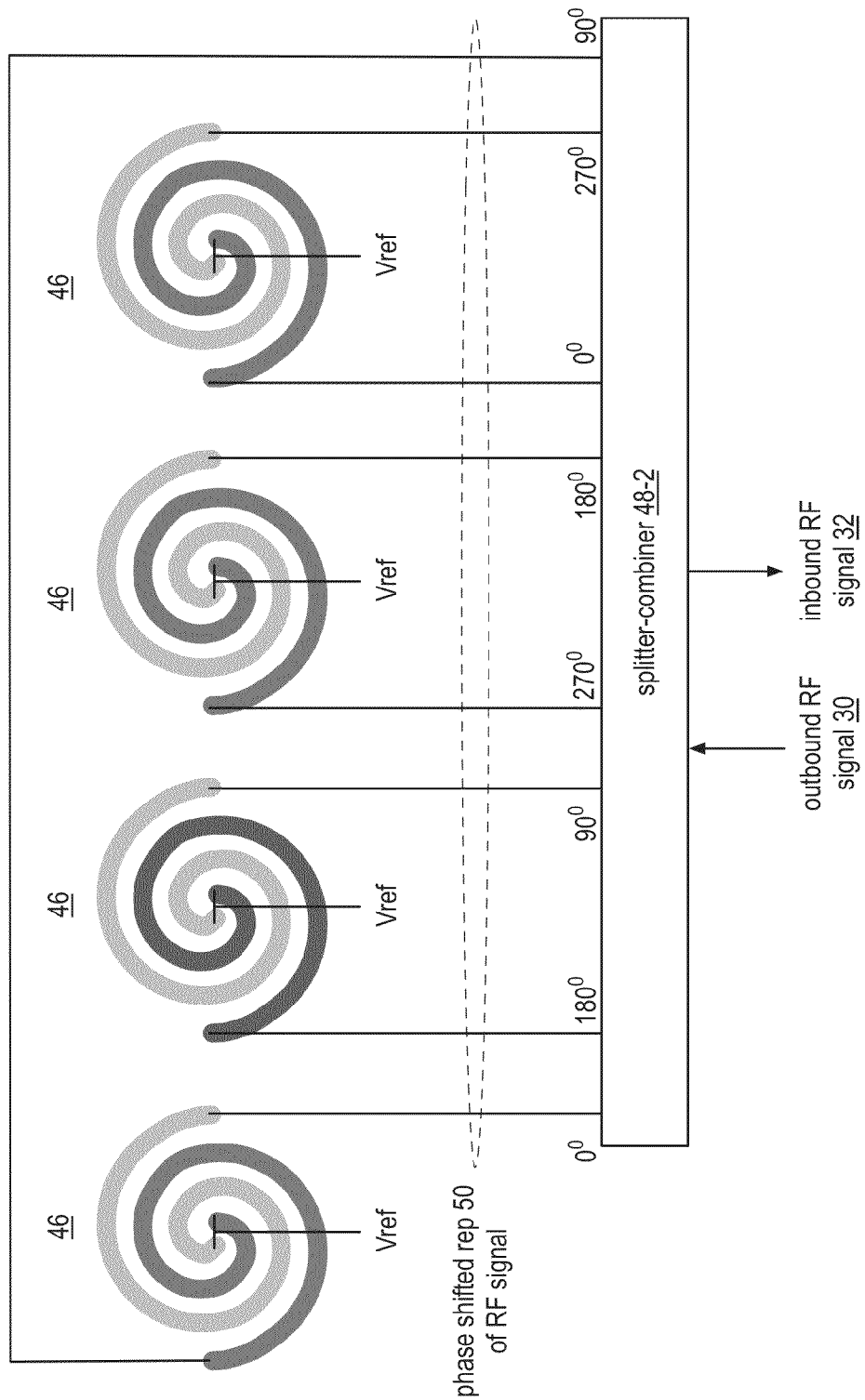
FIG. 17 is a schematic block diagram of another embodiment of a three-dimensional antenna assembly in accordance with the present invention.

FIG. 17 is a schematic block diagram of another embodiment of a three-dimensional antenna assembly 12 that includes a plurality of spiral dipole antenna sections 46 and a splitter-combiner 48-2. The coupling configuration of the antenna sections 46 includes coupling a short across the dipole feed point of each of the antenna sections 46 and coupling ends of different antenna sections to differential connections (e.g., non-inverting leg and inverting leg) of the splitter-combiner 48-2 as shown. In this configuration, a multiple cycle standing wave sinusoidal signal (current and voltage) is created across the antenna sections 46 to increase transmit power and to increase receiver sensitivity.

Figure 18:
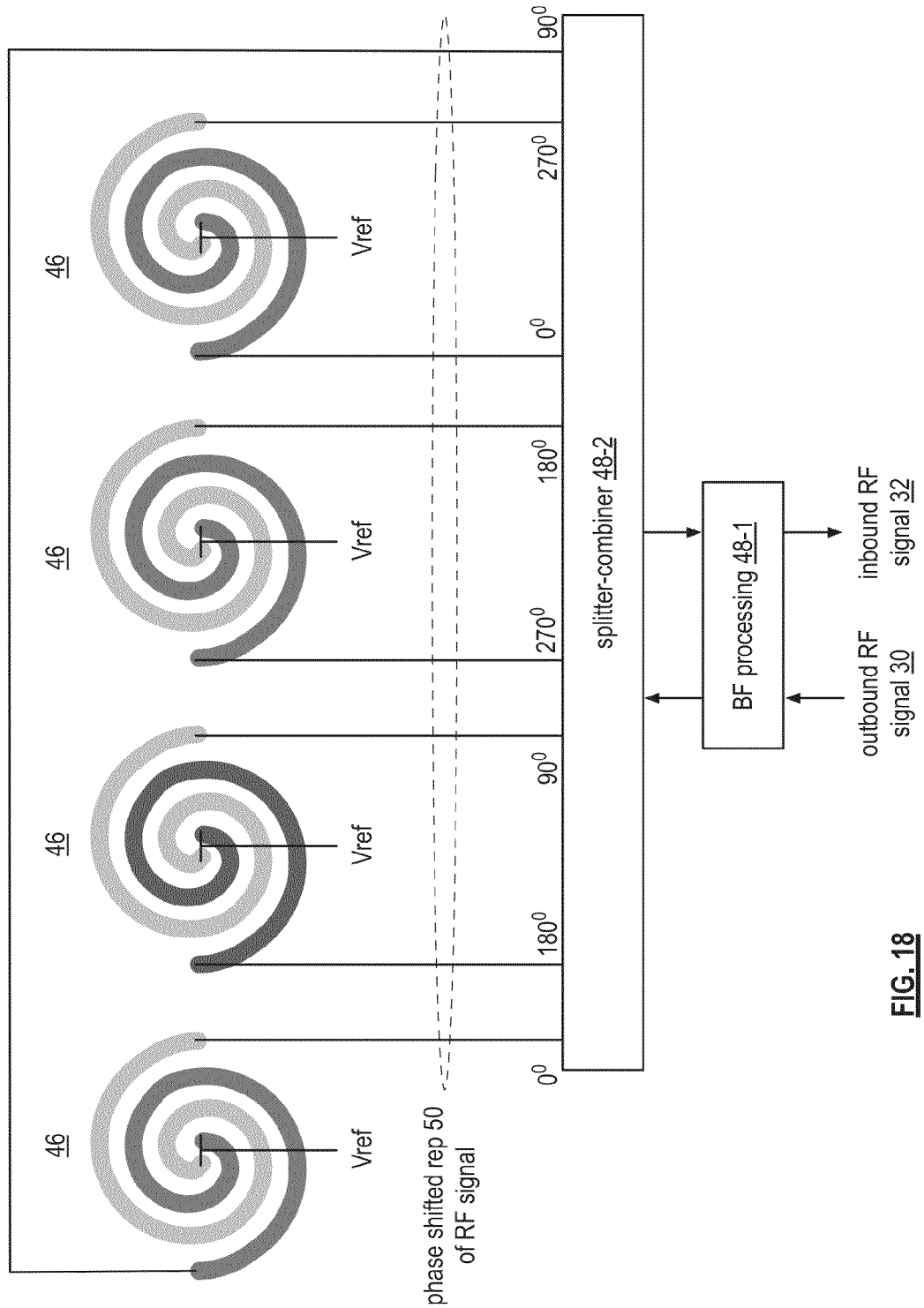
FIG. 18 is a schematic block diagram of another embodiment of a three-dimensional antenna assembly in accordance with the present invention.

FIG. 18 is a schematic block diagram of another embodiment of a three-dimensional antenna assembly similar to the antenna assembly 12 of FIG. 17 with the addition of the beamforming (BF) processing module 48-1. As mentioned above in one example embodiment, the BF processing module 48-1 determines a beamforming angle and generates a phase shifted RF signal (inbound or outbound). The splitter-combiner 48-2 splits or combines between the phase offset representations of the RF signal and the phase shifted RF signal. As mentioned above in another example embodiment, the BF processing module 48-1 determines which of the antenna sections are to transmit or receive a beamformed RF signal.

Figure 19:
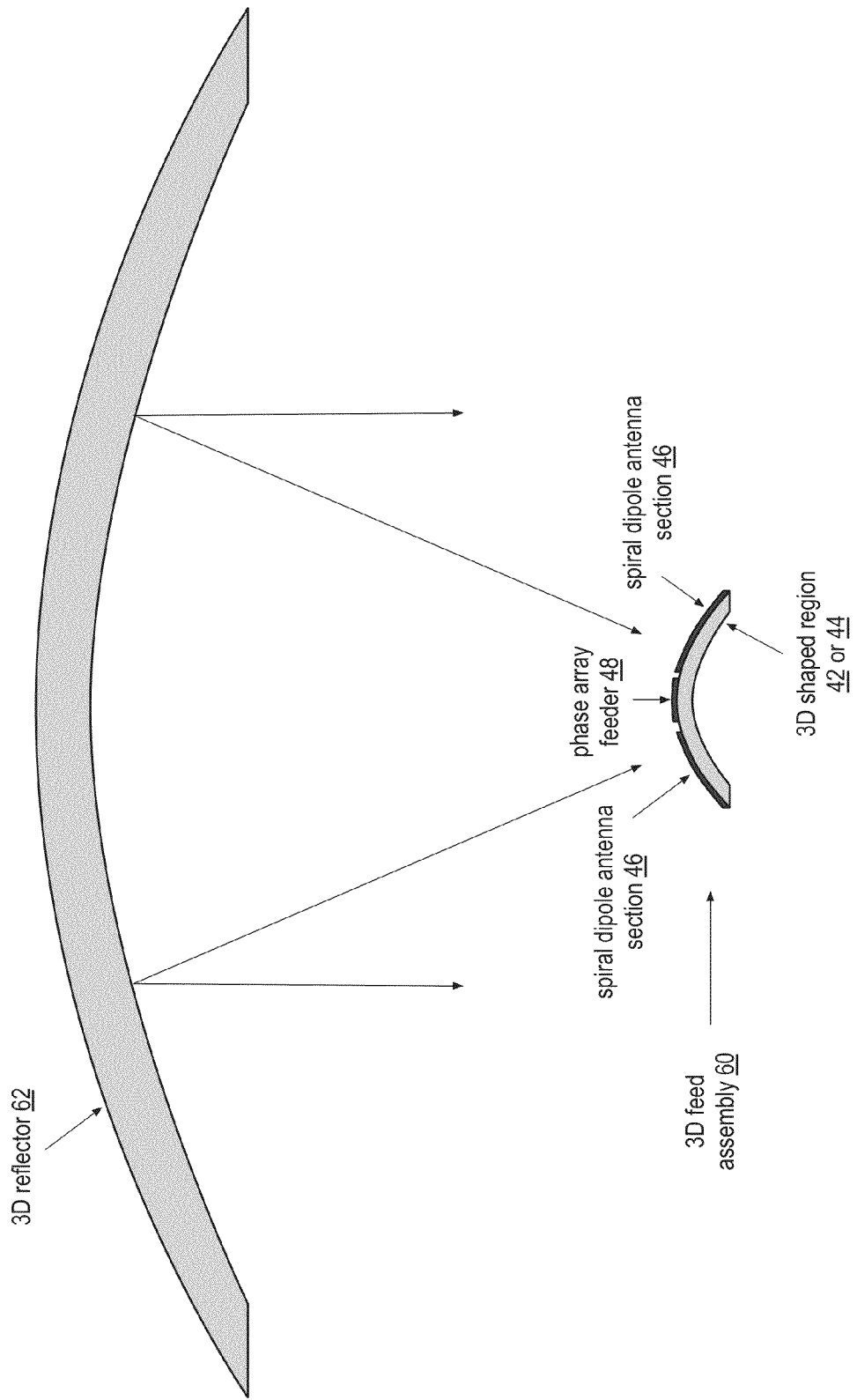
FIG. 19 is a schematic block diagram of another embodiment of a three-dimensional antenna assembly in accordance with the present invention.

FIG. 19 is a schematic block diagram of another embodiment of a three-dimensional antenna assembly 12 that includes a three-dimensional (3D) feed assembly 60 and a 3D reflector 62. The 3D feed assembly 60 includes an antenna assembly 12 of antenna sections 46 and a phase array feeder 48 on a hyperbolic shaped substrate 40. The 3D reflector 62 reflects an inbound RF signal to the antenna sections 46 and reflects phase offset representations of the outbound RF signal from the antenna sections 46.

Figure 20:
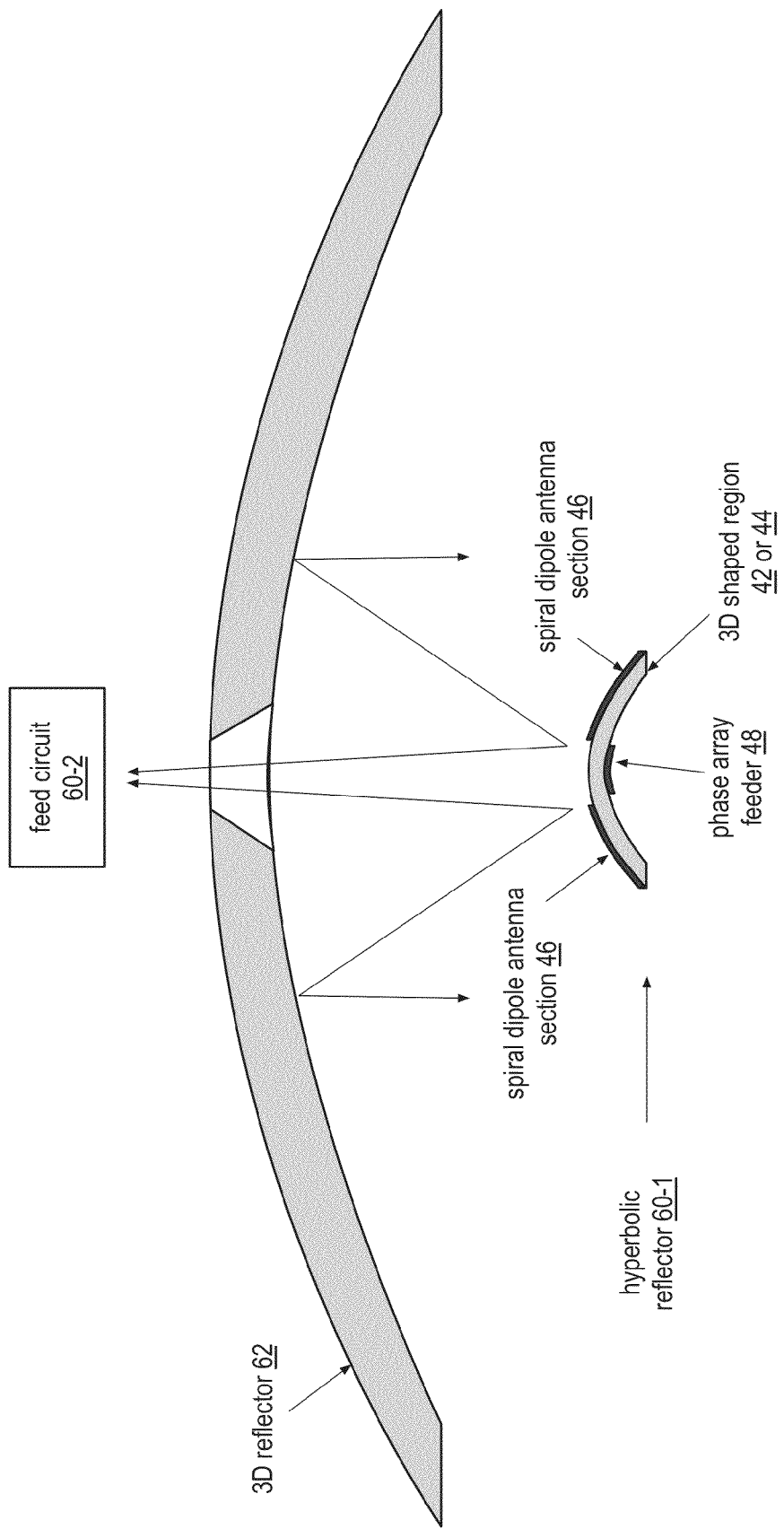
FIG. 20 is a schematic block diagram of another embodiment of a three-dimensional antenna assembly in accordance with the present invention.

FIG. 20 is a schematic block diagram of another embodiment of a three-dimensional antenna assembly 12 that includes the 3D reflector 62 and a hyperbolic reflector 60-1 and a feed circuit 60-2 as the 3D feed assembly 60. The hyperbolic reflector 60-1 includes an antenna assembly 12 of antenna sections 46 and a phase array feeder 48 on a hyperbolic shaped substrate 40 and reflects RF signals to and from the feed circuit 60-2. The 3D reflector 62 reflects an inbound RF signal to the antenna sections 46 and reflects phase offset representations of the outbound RF signal from the antenna sections 46.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An antenna assembly comprises:
   a substrate having a three-dimensional shaped region;
   a plurality of spiral dipole antenna sections, wherein each spiral dipole antenna section of the plurality of spiral dipole antenna sections is supported by a corresponding section of the three-dimensional shaped region and conforms to the corresponding section of the three-dimensional shaped region such that, collectively, the plurality of spiral dipole antenna sections has an overall shape approximating a three-dimensional shape, wherein the plurality of spiral dipole antenna sections is coupled together in accordance with a coupling configuration; and
   a phase array feeder operable to:
      input, or output, a plurality of phase offset representations of a radio frequency (RF) signal from, or to, the plurality of spiral dipole antenna sections; and
      convert between the plurality of phase offset representations of the RF signal and the RF signal.

2. The antenna assembly of claim 1, wherein the phase array feeder is further operable to:
   determine a beamform angle for receiving an inbound RF signal or transmitting an outbound RF signal, wherein the RF signal corresponds to the inbound RF signal or the outbound RF signal; and
   establish the plurality of phase offset representations of the RF signal in accordance with the beamform angle.

3. The antenna assembly of claim 1 further comprises:
   each spiral dipole antenna section of the plurality of spiral dipole antenna sections including a non-inverting spiral coil, an inverting spiral coil, and a dipole feed point proximal to an inner winding of the non-inverting and inverting spiral coils; and
   the coupling configuration including coupling the non-inverting spiral coils and the inverting spiral coils of the plurality of spiral dipole antenna sections such that the plurality of spiral dipole antenna sections function as transformer baluns and antennas for the antenna assembly.

4. The antenna assembly of claim 3, wherein the coupling configuration further comprises:
   coupling respective ones of the plurality of phase offset representations of the RF signal to the dipole feed points of the plurality of spiral dipole antenna sections; and
   coupling ends of the non-inverting spiral coils of ones of the plurality of spiral dipole antenna sections to ends of the inverting spiral coils of other ones of the plurality of spiral dipole antenna sections.

5. The antenna assembly of claim 1 further comprises:
   each spiral dipole antenna section of the plurality of spiral dipole antenna sections including a non-inverting spiral coil, an inverting spiral coil, and a dipole feed point proximal to an inner winding of the non-inverting and inverting spiral coils; and
   the coupling configuration including:
      coupling a short across the dipole feed point of each of the plurality of spiral dipole antenna sections; and
      coupling, for each of the plurality of phased offset representations of the RF signal, a non-inverting leg of the phase offset representation to an end of the non-inverting spiral coil of one of the plurality of spiral dipole antenna sections and coupling an inverting leg of the phase offset representation to an end of the inverting spiral coil of another one of the plurality of spiral dipole antenna sections.

6. The antenna assembly of claim 1, wherein a spiral dipole antenna section of the plurality of spiral dipole antenna sections comprises:
   a non-inverting spiral coil;
   an inverting spiral coil; and
   a dipole feed point proximal to an inner winding of the non-inverting and inverting spiral coils, wherein each of the non-inverting spiral coil and the inverting spiral coil has an Archimedean symmetric spiral shape, an Archimedean eccentric spiral shape, an equiangular symmetric spiral shape, or an equiangular eccentric spiral shape.

7. The antenna assembly of claim 6, wherein each of the non-inverting spiral coil and the inverting spiral coil comprises one of:
   a substantially solid conducive material with a multiple turn spiral slot separating the non-inverting spiral coil from the inverting spiral coil; and
   a conductive wire formed as a multiple turn spiral, wherein a lower end of a frequency band of antenna assembly is based on a radius of the plurality of dipole spiral antenna sections.

8. The antenna assembly of claim 1, wherein the substrate comprises one of:
   one or more printed circuit boards;
   one or more integrated circuit package substrates; and
   an non-conductive fabricated antenna backing structure, wherein the three-dimensional shaped region includes one of:
      a cup shape;
      a conical shape;
      a cylindrical shape;

a pyramid shape;
a box shape;
a spherical shape;
a parabolic shape; and
a hyperbolic shape.

9. An antenna assembly comprises:
a three-dimensional feed assembly that includes:
 a substrate having a three-dimensional shaped region;
 a plurality of spiral dipole antenna sections, wherein each spiral dipole antenna section of the plurality of spiral dipole antenna sections is supported by a corresponding section of the three-dimensional shaped region and conforms to the corresponding section of the three-dimensional shaped region such that, collectively, the plurality of spiral dipole antenna sections has an overall shape approximating a three-dimensional shape, wherein the plurality of spiral dipole antenna sections is coupled together in accordance with a coupling configuration; and
 a phase array feeder operable to:
  convert a plurality of phase offset representations of an inbound radio frequency (RF) signal received from the plurality of spiral dipole antenna sections into a received RF signal; and
  convert an outbound RF signal into a plurality of phase offset representations of the outbound RF signal and output the plurality of phase offset representations of the outbound RF signal to the plurality of spiral dipole antenna sections; and
a three dimensional reflector operable to:
 reflect the inbound RF signal to the plurality of spiral dipole antenna sections, wherein the plurality of spiral dipole antenna sections generates the plurality of phase offset representations of the inbound RF signal from the reflected inbound RF signal; and
 reflect the plurality of phase offset representations of the outbound RF signal.

10. The antenna assembly of claim 9, wherein the phase array feeder is further operable to:
 determine a beamform angle for receiving the inbound RF signal or transmitting the outbound RF signal; and
 establish the plurality of phased offset representations of the inbound or outbound RF signal in accordance with the beamform angle.

11. The antenna assembly of claim 9 further comprises:
 each spiral dipole antenna section of the plurality of spiral dipole antenna sections including a non-inverting spiral coil, an inverting spiral coil, and a dipole feed point proximal to an inner winding of the non-inverting and inverting spiral coils; and
 the coupling configuration including:
  coupling respective ones of the plurality of phase offset representations of the inbound or outbound RF signal to the dipole feed points of the plurality of spiral dipole antenna sections; and
  coupling ends of the non-inverting spiral coils of ones of the plurality of spiral dipole antenna sections to ends of the inverting spiral coils of other ones of the plurality of spiral dipole antenna sections.

12. The antenna assembly of claim 9 further comprises:
 each spiral dipole antenna section of the plurality of spiral dipole antenna sections including a non-inverting spiral coil, an inverting spiral coil, and a dipole feed point proximal to an inner winding of the non-inverting and inverting spiral coils; and the coupling configuration including:
 coupling a short across the dipole feed point of each of the plurality of spiral dipole antenna sections; and
 coupling, for each of the plurality of phased offset representations of the inbound or outbound RF signal, a non-inverting leg of the phase offset representation to an end of the non-inverting spiral coil of one of the plurality of spiral dipole antenna sections and coupling an inverting leg of the phase offset representation to an end of the inverting spiral coil of another one of the plurality of spiral dipole antenna sections.

13. The antenna assembly of claim 9, wherein a spiral dipole antenna section of the plurality of spiral dipole antenna sections comprises:
 a non-inverting spiral coil;
 an inverting spiral coil; and
 a dipole feed point proximal to an inner winding of the non-inverting and inverting spiral coils, wherein each of the non-inverting spiral coil and the inverting spiral coil has an Archimedean symmetric spiral shape, an Archimedean eccentric spiral shape, an equiangular symmetric spiral shape, or an equiangular eccentric spiral shape, and wherein each of the non-inverting spiral coil and the inverting spiral coil includes one of:
  a substantially solid conducive material with a multiple turn spiral slot separating the non-inverting spiral coil from the inverting spiral coil; and
  a conductive wire formed as a multiple turn spiral, wherein a lower end of a frequency band of antenna assembly is based on a radius of the plurality of dipole spiral antenna sections.

14. The antenna assembly of claim 9, wherein the substrate comprises one of:
 one or more printed circuit boards;
 one or more integrated circuit package substrates; and
 an non-conductive fabricated antenna backing structure, wherein the three-dimensional shaped region includes one of: a cup shape:
  a conical shape;
  a cylindrical shape;
  a pyramid shape;
  a box shape;
  a spherical shape;
  a parabolic shape; and
  a hyperbolic shape.

15. The antenna assembly of claim 9, wherein the three-dimensional feed assembly comprises one of:
 a hyperbolic feed circuit; and
 a hyperbolic reflector that reflects the inbound RF signal to a feed circuit or reflects the outbound RF signal from the feed circuit.

16. A radio frequency (RF) front-end module comprises:
 an antenna assembly that includes:
  a substrate having a three-dimensional shaped region;
  a plurality of spiral dipole antenna sections, wherein each spiral dipole antenna section of the plurality of spiral dipole antenna sections is supported by a corresponding section of the three-dimensional shaped region and conforms to the corresponding section of the three-dimensional shaped region such that, collectively, the plurality of spiral dipole antenna sections has an overall shape approximating a three-dimensional shape, wherein the plurality of spiral dipole antenna sections is coupled together in accordance with a coupling configuration; and a phase array feeder operable to:
   convert a plurality of phase offset representations of an inbound radio frequency (RF) signal received from the plurality of spiral dipole antenna sections into a received RF signal; and
   convert an outbound RF signal into a plurality of phase offset representations of the outbound RF signal and output the plurality of phase offset representations of the outbound RF signal to the plurality of spiral dipole antenna sections; and
a receive-transmit isolation module operably coupled to the antenna assembly, wherein the receive-transmit isolation module is operable to isolate the inbound RF signal and the outbound RF signal; and
a tuning module operable to tune the receive-transmit isolation module.

17. The RF front-end module of claim 16, wherein the antenna assembly further comprises:
a three dimensional reflector operable to:
   reflect the inbound RF signal to the plurality of spiral dipole antenna sections, wherein the plurality of spiral dipole antenna sections generates the plurality of phase offset representations of the inbound RF signal from the reflected inbound RF signal; and
   reflect the plurality of phase offset representations of the outbound RF signal.

18. The RF front-end module of claim 16, wherein the phase array feeder is further operable to:
determine a beamform angle for receiving the inbound RF signal or transmitting the outbound RF signal; and
establish the plurality of phased offset representations of the inbound or outbound RF signal in accordance with the beamform angle.

19. The RF front-end module of claim 16 further comprises:
each spiral dipole antenna section of the plurality of spiral dipole antenna sections including a non-inverting spiral coil, an inverting spiral coil, and a dipole feed point proximal to an inner winding of the non-inverting and inverting spiral coils; and
the coupling configuration including:
   coupling respective ones of the plurality of phase offset representations of the inbound or outbound RF signal to the dipole feed points of the plurality of spiral dipole antenna sections; and
   coupling ends of the non-inverting spiral coils of ones of the plurality of spiral dipole antenna sections to ends of the inverting spiral coils of other ones of the plurality of spiral dipole antenna sections.

20. The RF front-end module of claim 16 further comprises:
each spiral dipole antenna section of the plurality of spiral dipole antenna sections including a non-inverting spiral coil, an inverting spiral coil, and a dipole feed point proximal to an inner winding of the non-inverting and inverting spiral coils; and
the coupling configuration including:
   coupling a short across the dipole feed point of each of the plurality of spiral dipole antenna sections; and
   coupling, for each of the plurality of phased offset representations of the inbound or outbound RF signal, a non-inverting leg of the phase offset representation to an end of the non-inverting spiral coil of one of the plurality of spiral dipole antenna sections and coupling an inverting leg of the phase offset representation to an end of the inverting spiral coil of another one of the plurality of spiral dipole antenna sections.

* * * * *